United States Patent [19]

Baehrle et al.

[11] Patent Number: 4,693,301
[45] Date of Patent: Sep. 15, 1987

[54] METHOD FOR HEATING A ROAD BY MEANS OF GEOTHERMALLY FED HEATING INSTALLATION AS WELL AS A ROAD-HEATING INSTALLATION FOR CARRYING OUT THE METHOD

[75] Inventors: Friedrich Baehrle, Kernen-Rommelshausen; Helmut Wulf, Ostfildern; Helmut Kreeb, Meersburg, all of Fed. Rep. of Germany

[73] Assignee: Daimler-Benz Aktiengesellschaft, Fed. Rep. of Germany

[21] Appl. No.: 906,244

[22] Filed: Sep. 12, 1986

[30] Foreign Application Priority Data

Sep. 12, 1985 [DE] Fed. Rep. of Germany ....... 3532542

[51] Int. Cl.⁴ .............................................. F24J 3/08
[52] U.S. Cl. ..................................... 165/45; 165/32; 165/96; 126/271.2 A; 219/213
[58] Field of Search ............................ 165/45, 32, 96; 126/271.2 A; 219/213

[56] References Cited

U.S. PATENT DOCUMENTS

| | | | |
|---|---|---|---|
| 3,517,730 | 6/1970 | Wyatt | 165/32 |
| 3,521,699 | 7/1970 | Van Huisen | 165/45 |
| 3,958,627 | 5/1976 | Edelstein. | |
| 4,609,035 | 9/1986 | Haslett et al. | 165/96 |

FOREIGN PATENT DOCUMENTS

| | | | |
|---|---|---|---|
| 657118 | 4/1979 | U.S.S.R. | 165/45 |
| 3,143,237 | 12/1983 | Fed. Rep. Germany. | |

Primary Examiner—Albert W. Davis, Jr.

[57] ABSTRACT

A road heating installation which is supplied by heat stored in the ground and which includes heat pipes placed heat-conductingly with the road surface, is provided with sensors for detecting the climate factors relevant for the road condition and is equipped with a control apparatus that controls the heating installation as a function of the climate. In order to remove the heat energy stored in the ground only in case of need and to avoid the unnecessary exhaustion thereof, the invention provides that the heat transfer capacity of the heat pipe is controllable by a reversible blocking of the condensation zones of the heat pipes and the blocking is brought about in case of a dry-cold by the supply of an inert gas into the condensation zones of the heat pipes which is quantity-regulatable directly from the outside.

28 Claims, 2 Drawing Figures

METHOD FOR HEATING A ROAD BY MEANS OF GEOTHERMALLY FED HEATING INSTALLATION AS WELL AS A ROAD-HEATING INSTALLATION FOR CARRYING OUT THE METHOD

BACKGROUND AND SUMMARY OF THE INVENTION

The present invention relates to a method for heating a road by means of a heating installation fed with heat from the ground as well as to a road heating installation for carrying out this method of the type described, for example, in the German Pat. No. 31 43 237.

The transfer of heat energy by heat pipes is dependent on the temperature behavior of the heat carrier medium present in the heat pipe and the temperature gradient between the condensation and evaporation zone of the heat pipe. With the use of heat pipes for heating roads the heat carrier is so selected that it evaporates under heat absorption at the relative constant temperatures prevailing in the depth of the ground and gives off this heat to the road by condensation in the condensation zone of the heat pipes disposed directly below the road surface at slightly lower temperatures but still lying above the freezing point, whereby the condensate flows back preferably under gravity influence to the evaporation zone located deep within the ground. With non-controllable heat pipes the circulatory process, which results thereby, continues for such length of time as the temperature gradient necessary for the evaporation and condensation of the heat carrier medium exists. During winter periods it can be assumed that the heat pipes are in operation over relatively long periods of time and also when a heating of the road would not be necessary as such, namely for example, at temperatures below the freezing point and with a dry road--at the so called dry-cold. A heating of the road can be dispensed with, of course, also at temperatures above the freezing point. However, the heat energy stored in the ground is thereby used up under certain circumstances prior to the termination of the cold period.

In order to assure the operability of a road heating installation also with exhausted ground heat or at extremely cold temperatures the aforementioned German Pat. No. 32 43 237 suggests to connect the heat pipes heat at their lowest place conductingly with an external heat source. However, it is not possible thereby to prevent a premature exhaustion of the heat stored in the ground.

A heat pipe is described in the U.S. Pat. No. 3,958,627 which is controllable in its heat transfer capacity by the blocking of its condensation zone by means of an inert gas. A reservoir tank of constant volume and filled with an inert gas is thereby assembled directly to the heat pipe whereby the inert gas is in communication by way of a continuously open inlet with a condensation zone of the heat pipe. The greater the heat quantity supplied to this heat pipe at its evaporation zone, the more the inert gas is pushed back into the reservoir tank and the more the condensation zone of the heat pipe blocked by the inert gas is released. A control of the heat transfer capacity is therefore possible with this heat pipe only indirectly by way of a change of the heat quantity supplied to the evaporation zone. A self-regulating effect, so to speak, of the heat pipe is to be achieved thereby.

It is the object of the present invention to further improve the road heating installation supplied with ground heat described in the German Pat. No. 31 43 237 to the extent that a heat removal from the ground takes place only in case in need and thus an unnecessary use-up of the heat energy stored in the ground is avoided.

The underlying problems are solved according to the present invention from a method point of view in that the heat transfer capacity of the heat pipes is blocked during a dry cold by a quantity-regulated introduction of inert gas into the condensation zone of the heat pipes and the blocking is lifted by the also regulated return thereof out of the condensation zone with changing prerequisites. From an apparatus point of view the underlying problems are solved according to the present invention in that the ends of the condensation zones of several heat pipes disposed adjacent one another which are located within the area of the road are connected at least indirectly fluidically in parallel with a gas line and the latter is connected to a reservoir tank for the inert gas. By reason of the supply of the inert gas which is controllable as regards quantity directly from the outside, into the condensation zone of the heat pipe, it is possible to block the condensation zone up to a point of complete blockage and thus to render the heat pipe inoperable with a dry cold or at temperatures above the freezing point. The ends of the condensation zones of several heat pipes disposed adjacent one another which are located within the area of the road are connected at least indirectly fluidically in parallel with a gas line and the latter is connected to a reservoir tank. In this manner up to about 100 heat pipes can be combined into a controllable unit and can be supplied with inert gas from a single reservoir tank, for example, with nitrogen.

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
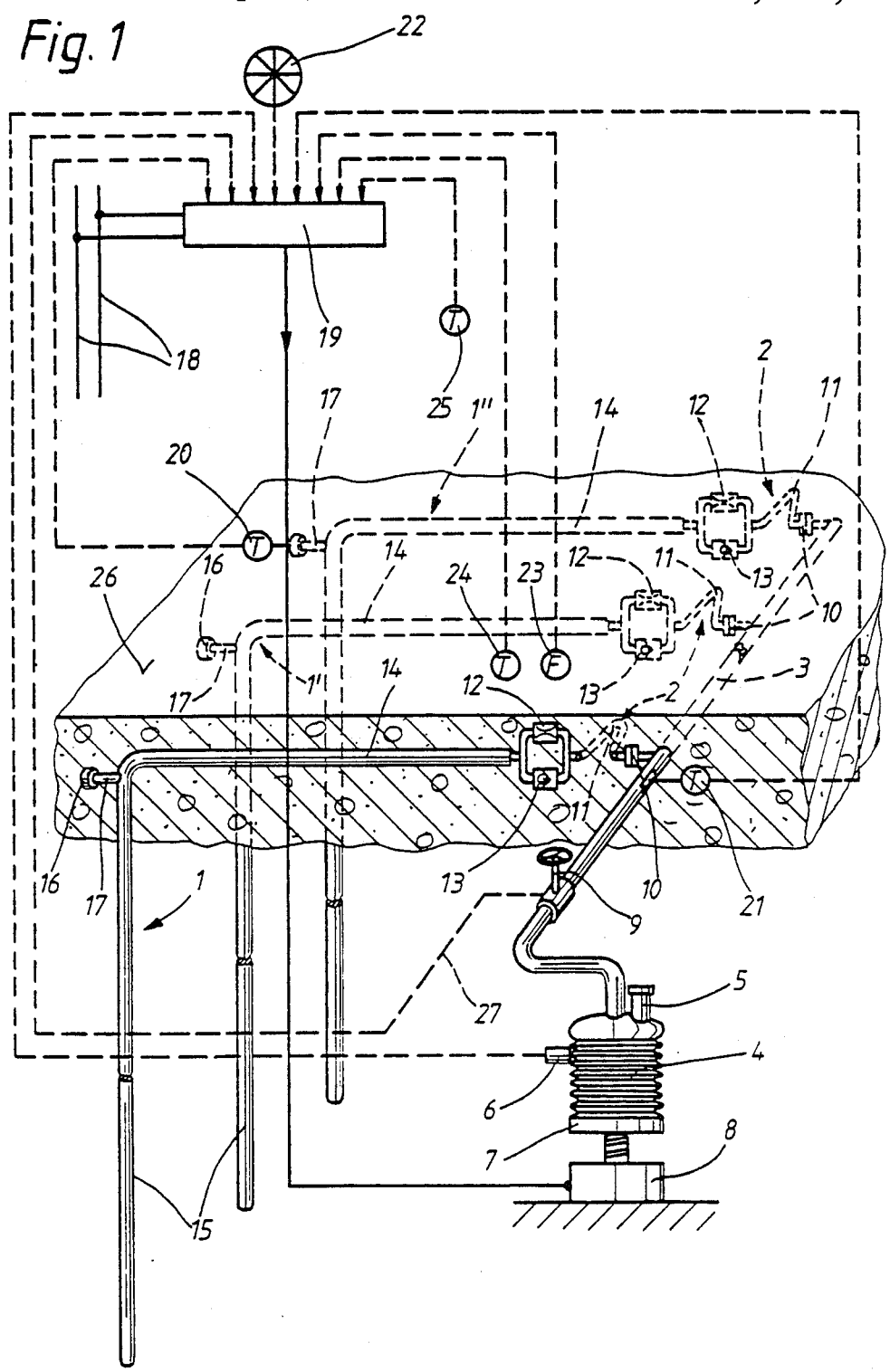
FIG. 1 is a somewhat schematic perspective view, partly broken away, of a road heating installation by means of heat pipes placed into the ground and having an inert gas reservoir tank changeable in volume in accordance with the present invention.

Referring now to the drawing wherein like reference numerals are used throughout the two views to designate like parts, only the first heat pipe 1 and the two last heat pipes 1' and 1" of a large number of heat pipes to be controlled in common are illustrated in FIG. 1. The heat pipes 1, 1' and 1" are connected by way of intermediate pipes 2 and by way of the gas line 3 connecting the individual heat pipes with the inert gas reservoir constructed as bellows 4. The bellows 4 includes the filling pipe connection 5, the limit switch 6 and the reinforced bottom plate 7 operating as adjusting member which is coupled to an electrically driven spindle drive 8. A manually actuatable closure valve 9 is arranged in the gas line 3. The intermediate pipes 2 are threadably connected to the gas line in a vacuum-tight manner by way of flange connections 10 and are provided with expansion loops 11 extending at the same height level. Furthermore, the intermediate pipes 2 include each a check valve 13 connected fluidically in parallel with a throttle 12. The condensation zones 14 of the heat pipes 1, 1' and 1" adjoin the intermediate pipes 2, which are arranged directly underneath the road surface 26 with a slight slope of at least 2° starting from the intermediate pipes 2. The condensation zones 14 pass over into the evaporation zones 15 of the heat pipes 1, 1' and 1" which are sunk up to 15 meters into the ground. Within the area between the condensation zones 14 and the evaporation zones 15 all heat pipes include measuring connections 17 provided with closure caps 16, the measuring connections 17 are closed with respect to the interior of the heat pipes but can receive a temperature sensor for detecting the wall temperature of the heat pipes for monitoring the functioning thereof.

The signals from the temperature sensor 20 inserted into the measuring connection 17 located farthest away, from the manual valve 9, from the limit switch 6, from the wind measuring probe 22, from the temperature measuring device 21, from the moisture measuring device 23 measuring the moisture near the road, from the road temperature sensor 24 and from the outside air temperature sensor 25 are fed as inputs to a control apparatus 19 connected to an electric supply network 18.

In the operating condition of the heat pipes the heat carrier medium present in the evaporation zone 15 evaporates thereat under heat removal from the ground, the vapor rises upwardly and condenses in the condensation zone 14 under heat transfer to the road surface 26. If the sensors 22 to 25 which detect the climatic factors relevant for the road condition, determine climatically favorable prerequisites for a road condition not endangered by snow or ice,—i.e., for example, dry cold or temperatures above the freezing point—then the bottom plate 7 of the bellows 4 is displaced upwardly by way of the control apparatus 19 and by way of the spindle drive 8 and as a result thereof the volume of the bellows 4 containing the inert gas is reduced. The inert gas is fed out of the bellows 4 through the manual valve 9 which normally is constantly in the open position, and by way of the connecting line 3 to the intermediate pipes 2 leading to the individual heat pipes. It then flows by way of the check valves 13 which open thereby, into the condensation zones 14 of the heat pipes and displaces the vapor-condensate mixture of the heat carrier medium present thereat. Inert gas and heat carrier medium have thereby different temperatures whereby the heat carrier medium is at a higher temperature level than the inert gas. The measurement connection 17 of the heat pipes coupled with one another are reached by the inflowing inert gas, at first in the adjacent heat pipe 1 and thereafter with slight time differences in the most remote heat pipes 1' and 1". The temperature sensor 20 which is preferably installed on the heat pipe only in the measuring connection 17 of the last heat pipe 1", thereby responds to the relatively lower temperature of the inert gas in comparison to that of the heat carrier medium and transmits this as signal to the control apparatus 19 which stops the drive of the spindle drive 8 and thus the further supply of inert gas into the heat pipes. The condensation zones of all heat pipes are now filled with inert gas and the heat carrier medium is pushed back into the evaporation zone. The heat transfer circulation is thus interrupted and the heat pipes are turned off.

With a change of the weather situation detected by the climatic sensors 22 to 25, i.e, for example with starting snowfall or with a freezing-up wetness, the control apparatus sets the spindle drive anew into operation and the bellows 4 is now expanded by the downward movement of the adjusting member which now takes place, as a result of which the inert gas flows out of the heat pipes back into the line 3. The check valves 13 thereby close automatically and the inert gas is now able to return back into the bellows 4 only by way of the throttles 12 and the line 3. However, as soon as heat carrier medium which is at a higher temperature level flows into the partial area of the line extending from the heat pipe 1 to the bellows 4, this is indicated to the control apparatus 19 by way of the temperature measuring device 21 which responds thereto, and the spindle drive is turned off. The condensation zones 14 of the heat pipes are now again free of inert gas and the heat pipes begin anew with the transport of heat from the ground to the road surface 26. The throttles 12 thereby have the purpose to achieve a certain equalization of the flow of the inert gas out of the different condensation zones. They can also achieve this effect if the throttling action of all throttles is equal among each other but considerably larger than the normal flow resistance of the line to the reservoir tank 4. The differences of the different overall-flow resistances are then only relatively small and thus also the differences of the flowing-off quantities. Though with the lifting of the blocking of the condensation zones all connected condensation zones are to be emptied completely of inert gas, it is nonetheless to be prevented that larger quantities of vapor of the heat carrier medium leave the heat pipes located fluidically farther forwardly and reach the reservoir tank.

In order to achieve a still better equalization effect of the flow resistances, the throttles which are arranged in the intermediate pipes 2 fluidically in parallel with the check valves 13, may have a flow resistance increasing from the heat pipe 1" to the first heat pipe 1. As a result thereof the overall flow resistance is completely equalized which with the return of the inert gas out of the individual heat pipes is also of different magnitude by reason of the differently long paths up to the bellows 4. In order to prevent that the heat carrier medium is fed from the heat pipes into the bellows, the temperature measuring device 21 should be arranged as close as possible to the first heat pipe 1 at the line 3 leading to the heat pipes. The expansion loops 11 of the intermediate pipes 2 serve for compensation of changes in length of the heat pipes and of assembly inaccuracies. The line 3 can be closed off by means of the manual valve 9 which facilitates the carrying out of repair works at the bellows 4 or at the heat pipes 1, 1' and 1". The control apparatus 19 is constantly informed about the opening condition of the valve 9 by way of the signal line 27. Therebeyond the limit switch 6 at the bellows 4 indicates to the control apparatus 19 when the maximum compression condition of the bellows has been reached and thus limits the pressure building up in the pipe system. In order to be able to monitor the operability of the individual heat pipes it is possible to insert manually temperature sensors into the measurement connections 17 after the opening of the closure caps 16 or to install the same thereat permanently. With proper operation the temperatures at this location should be approximately equal in all the heat pipes.

It is also possible within the scope of the present invention that the bellows is not actuated by way of a spindle drive but that instead it is located within a pressure vessel and that the bellows is compressed by heating up the air present between the bellows and the pressure vessel. As the result thereof, also the inert gas would be heated up at the same time and expanded in its volume. A cooling off of the same air including the inert gas would then effect the opposite, namely an expansion of the bellows and a flowing back of the inert gas. In this modification a positively actuated valve would have to be arranged in the inlet line 3 in lieu of the manual valve 9, which prevents an unintentional backflow of the inert gas.

Figure 2:
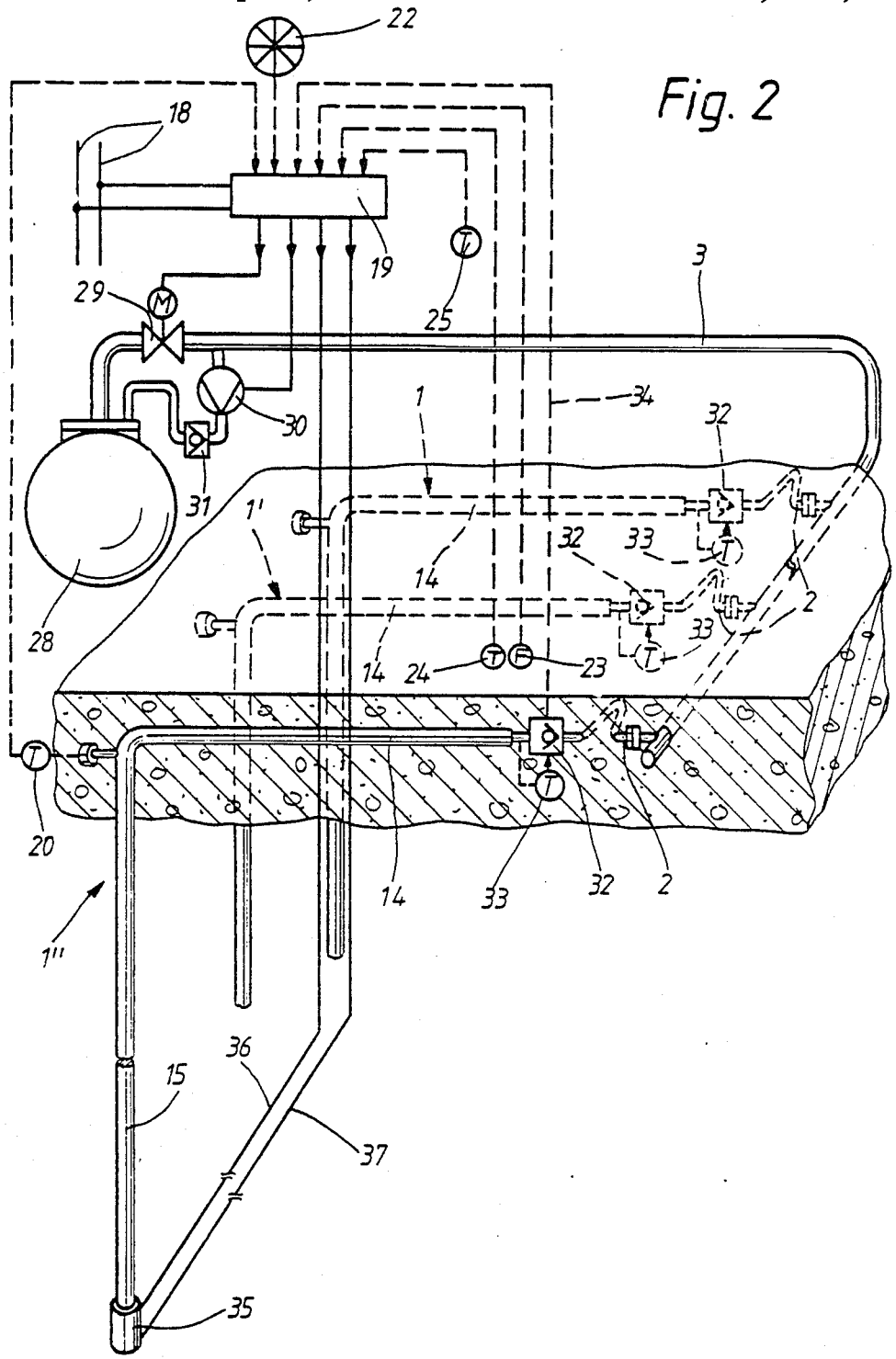
FIG. 2 is a somewhat schematic perspective view, partly broken away, of a road heating installation by means of heat pipes placed into the ground and having an inert gas reservoir tank with a constant volume in accordance with the present invention.

The road heating installation illustrated in FIG. 2 differs from that in FIG. 1, inter alia, in that in lieu of the bellows with variable volume a pressure tank 28 having a constant volume serves as inert gas reservoir tank. A closure valve 29 automatically actuatable by the control apparatus 19 is arranged in the gas line 3 leading from the pressure tank 28 to the intermediate pipes 2; the pump 30 and the check valve 31 preventing a discharge of inert gas out of the pressure tank 28 are fluidically arranged in parallel with the closure valve 29. Check valves 32 responding as a function of temperature are installed into the intermediate pipes 2, to which are fed as input the signals from the temperature sensors 33 detecting the pipe temperature between the heat pipes 1, 1' and 1" and the check valves 32. A signal transmitting line 34 leads to the control apparatus 19 from the check valve 32 of the heat pipe 1" which is located farthest away from the pressure tank 28. Heating cartridges 35 are installed at the lower ends of the heat pipes which are arranged and lowered to a depth in the ground, as an electric resistance heating device which—controlled by the control apparatus 19—utilize current from the network 18 by way of the energy transmitting lines 36 and 37.

In order to achieve a blocking of the heat pipes, the closure valve 29 is opened whereby inert gas flows out of the pressure tank 28 by way of the gas line 3 and the intermediate pipes 2 into the individual heat pipes. To assure a complete filling of the condensation zones 14 of the heat pipes with inert gas, the storage pressure in the pressure tank 28 having a constant volume should thereby be larger than the pressure of the heat pipes in the condition with blocked condensation zones. As soon as the temperature sensor 20 indicates to the control apparatus 19 the complete blocking of the condensation zones of the heat pipes by reason of the temperature drop at the measuring place owing to the relatively cool inert gas, the closure valve 29 is closed again.

With changed climatic conditions which make necessary a heating of the road, the control apparatus 19 turns on the pump 30 and thus puts into operation the heat pipes. The pump 30 then feeds the inert gas out of the heat pipes back into the pressure tank 28 in bypassing relation to the closure valve 29 which continues to be closed. During the inflow of inert gas which in comparison to the heat carrier medium is at a lower temperature level, into the intermediate pipes 2, the temperature sensors 33 respond and automatically close the intermediate pipes 2. As soon as the check valve 32 which is farthest away from the pressure tank 28 is closed, this is indicated to the control apparatus 19 by way of the signal transmitting line 34 and the pump 30 is again turned off. The check valves 32 which respond in dependence of the temperature thereby remain closed for such length of time until they are again acted upon with inert gas.

If the climate sensors 22 to 25, which are identical with those of the road heating installation described in FIG. 1, should indicate extreme weather conditions, in which the heat quantity stored in the ground would not suffice for heating the road, then the control apparatus 19 additionally turns on by way of the lines 36 and 37 the heating cartridge 35 installed at each heat pipe. In this manner a road heating installation is created which not only handles economically the heat quantities stored in the ground and removes the same only in case of need but which also assures the operating readiness of the installation upon the occurrence of extreme weather conditions by additionally turning on auxilliary heat sources.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A method for heating a road by means of a heating installation fed with heat stored in the ground which includes heat pipes placed in a heat conducting manner near the surface of the road, each having a condensation zone extending directly underneath the road surface and an evaporation extending to a depth in the ground for a heat carrier medium present in the heat pipes, sensors for detecting the determinative factors of the climate, of the road condition and of the heat pipes for a control apparatus, comprising the steps of blocking the heat transfer capacity of the heat pipes with a dry-cold by quantity regulated introduction of inert gas into the condensation zones of the heat pipes and by cancelling the blockage with changed prerequisites by an also regulated return of the inert gas out of the condensation zones.

2. A road heating installation, comprising heat pipe means placed heat conductingly near the road surface, each heat pipe means including a condensation zone extending directly underneath the road surface and an evaporation zone extending to a depth in the ground for a heat carrier medium disposed within the heat pipe means, sensor means for detecting the determinative factors of the climate, of the road condition and of the heat pipe means, and a control apparatus including control means, the output of the sensor means being fed as inputs to the control apparatus, and said control means being operable to block the heat transfer output of the heat pipe means with a dry-cold by quantity controlled introduction of an inert gas into the condensation zones of heat pipe means and by cancelling the blockage by controlled return of the inert gas out of the condensation zones with changed prerequisites.

3. A road heating installation according to claim 2, wherein the ends of the condensation zones located within the area of the road of several heat pipe means disposed adjacent one another are connected at least indirectly fluidically in parallel with a gas line, and wherein said gas line is operatively connected with a reservoir tank means for the inert gas.

4. A road heating installation according to claim 3, further comprising a closure valve means actuated by the control apparatus is arranged in the gas line between a heat pipe means and the reservoir tank means.

5. A road heating installation according to claim 3, wherein a temperature sensor means is arranged at the transition place between the condensation zone and the evaporation zone of the heat pipe means located farthest away from the reservoir tank means, the introduction of the inert gas into the condensation zones being terminated by said temperature sensor means by way of the control apparatus.

6. A road heating installation according to claim 3, wherein a temperature measuring means is arranged between the reservoir tank means and the heat pipe means located fluidically nearest the same, the return of the inert gas from the condensation zones being terminated by said temperature measuring means by way of the control apparatus.

7. A road heating installation according to claim 6, wherein the temperature measuring means terminating the return of the inert gas is arranged near the heat pipe means located closest to the reservoir tank means.

8. A road heating installation according to claim 3, wherein the reservoir tank means includes an adjusting member by means of which the volume of the reservoir tank means is adjustable.

9. A road heating installation according to claim 8, wherein the reservoir tank means includes a limit switch which renders inoperable the adjusting member either directly or by way of the control apparatus.

10. A road heating installation according to claim 8 wherein the reservoir tank is constructed as bellows.

11. A road heating installation according to claim 8, wherein the adjusting member is operatively connected with an electrically driven spindle drive.

12. A road heating installation according to claim 3, wherein the reservoir tank means is constructed a pressure tank having a constant volume, said pressure tank being operatively connected with a pump for the introduction for the inert gas into or for the return of the inert gas out of the condensation zones of the heat pipe means.

13. A road heating installation according to claim 12, wherein the reservoir pressure in the pressure tank is adjusted to be greater than the pressure of the inert gas in the condensation zones of the heat pipes means, the pump being arranged fluidically in parallel with the closure valve means and being provided with a check valve preventing an outflow of inert gas out of the pressure tank means through the pump line.

14. A road heating installation according to claim 3, wherein a measuring connection means is provided at each heat pipe means at the transition place between condensation zone and evaporation zone which serves the purpose of monitoring the functioning of the heat pipe means.

15. A road heating installation according to claim 3, wherein a check valve means responding as a function of temperature and closing in the return flow direction with a temperature drop, is arranged near the upper end of the condensation zone of each heat pipe means.

16. A road heating installation according to claim 15, wherein the check valve means is arranged in intermediate pipe means between the heat pipe means and the gas line.

17. A road heating installation according to claim 3, wherein a throttle means is installed near the upper end of the condensation zone of each heat pipe means.

18. A road heating installation according to claim 17, wherein the throttle means is arranged in intermediate pipe means between the heat pipe means and the gas line.

19. A road heating installation according to claim 17, wherein the effects of the different throttle means are arranged corresponding to the fluidic distance of the respective condensation zone to the reservoir tank means in such a manner that the flow resistances from the individual condensation zones to the reservoir tank means are substantially equal.

20. A road heating installation according to claim 17, further comprising a bypass line bypassing the throttle means, and a check valve in the bypass line and closing in the flow direction toward the reservoir tank means.

21. A road heating installation according to claim 15, wherein a throttle means is installed near the upper end of the condensation zone of each heat pipe means.

22. A road heating installation according to claim 21, further comprising a bypass line bypassing the throttle means, and a check valve in the bypass line and closing in the flow direction toward the reservoir tank means.

23. A road heating installation according to claim 22, wherein the effects of the different throttle means are arranged corresponding to the fluidic distance of the respective condensation zone to the reservoir tank means in such a manner that the flow resistances from the individual condensation zones to the reservoir tank means are substantially equal.

24. A road heating installation according to claim 5, wherein a temperature measuring means is arranged between the reservoir tank means and the heat pipe means located fluidically nearest the same, the return of the inert gas from the condensation zones being terminated by said temperature measuring means by way of the control apparatus.

25. A road heating installation according to claim 24, wherein the temperature measuring means terminating the return of the inert gas is arranged near the heat pipe means located closest to the reservoir tank means.

26. A road heating installation according to claim 25, wherein a measuring connection means is provided at each heat pipe means at the transition place between condensation zone and evaporation zone which serves the purpose of monitoring the functioning of the heat pipe means.

27. A road heating installation according to claim 25, wherein a check valve means responding as function of temperature and closing in the return flow direction with a temperature drop, is arranged near the upper end of the condensation zone of each heat pipe means.

28. A road heating installation according to claim 27, wherein a throttle means is installed near the upper end of the condensation zone of each heat pipe means.

* * * * *